Nov. 3, 1931.  J. MAZER  1,830,235
RING EXPANDER
Filed June 13, 1929
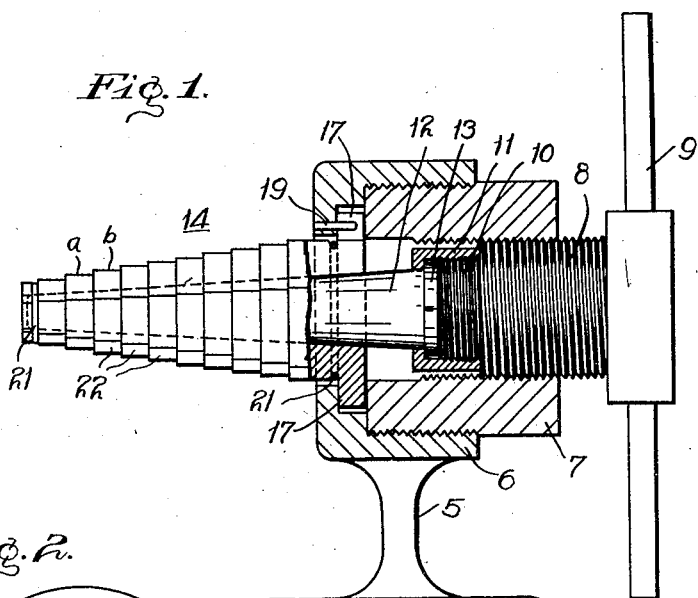
Fig. 1.
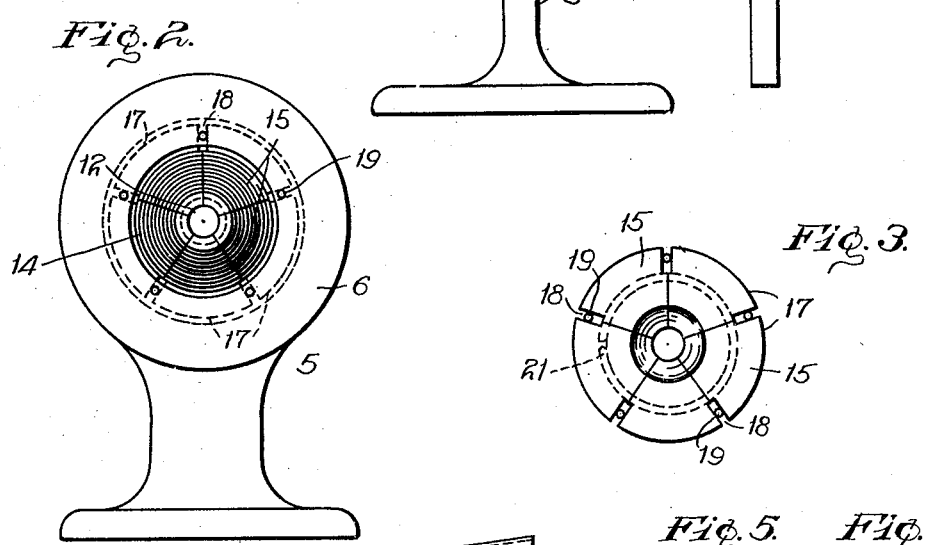
Fig. 2.   Fig. 3.
Fig. 5.   Fig. 6.
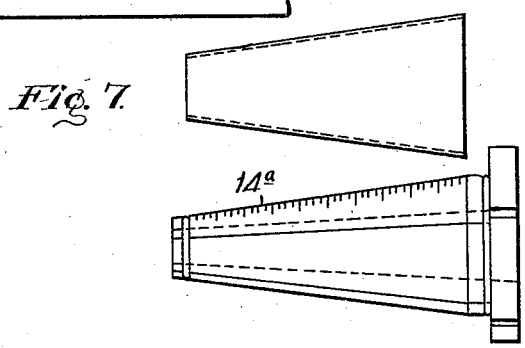
Fig. 7.
Fig. 4.
INVENTOR
Joseph Mazer
By Archworth Martin,
Attorney Patented Nov. 3, 1931

1,830,235

UNITED STATES PATENT OFFICE

JOSEPH MAZER, OF NEW YORK, N. Y.

RING EXPANDER

Application filed June 13, 1929. Serial No. 370,536.

My invention relates to ring expanders, and more particularly to devices for stretching or enlarging finger rings or similarly-shaped articles.

One object of my invention is to provide a ring expander or stretcher of simple form which is nevertheless effective in operation and from which an expanded ring may be readily removed.

Another object of my invention is to provide an expander capable of accurately stretching rings to a desired degree with great exactness.

Still another object of my invention is to provide an expander of such form that the inner periphery of the ring will expand in lines parallel to the axis thereof, notwithstanding the generally tapered form of the mandrel upon which the ring is expanded.

Some of the forms which my invention may take are shown in the accompanying drawings, wherein Fig. 1 is a view of the device, partially in side elevation and partially in section; Fig. 2 is an end elevational view of the device of Fig. 1; Fig. 3 is a rear elevational view of the mandrel of Fig. 1, showing the guide pins for the mandrel segments; Fig. 4 is a view showing a modification of the mandrel of Fig. 1; Figs. 5 and 6 show a sleeve of the type which may be employed with the mandrel of Fig. 1, and Fig. 7 shows a sleeve for the mandrel of Fig. 4.

Referring to Figs. 1 to 3, the device consists of a base or pedestal 5 which carries a chambered block 6. The block 6 is threaded for connection with a sleeve 7 with which an operating screw 8 has threaded engagement.

The screw 8 has a perforated enlargement at its outer end for the reception of a handle by means of which it may be turned. The inner end of the screw 8 is of reduced diameter as shown at 10. This reduced portion is threaded so that a cap 11 may be screwed into position thereon. The cap 11 serves to detachably connect a plunger or punch 12 to the screw 8, the plunger having a flanged head 3 with which the outer flanged end of the cap 1 has clamping engagement.

The plunger 12 is of tapered form toward its outer end. A mandrel 14 is loosely held between the block 6 and the inner end of the sleeve 7, and has a central perforation extending axially thereof. The perforation is of tapering form and conforms to the taper of the plunger 12. The mandrel 14 is composed of segments 15 which are shown as five in number, but, it may have a greater or less number of segments, as desired. The mandrel is formed by drilling a tapering hole axially of a bar and thereafter slitting the bar along radial lines, as shown more clearly in Figs. 2 and 3, to divide it into segments. Each of the segments 15 has a radially-extending flange 17 at its base, the flanges being cut away as indicated at 18 to form wide slots for the reception of guide pins 19 that are carried by the block 6. These pins hold the segments in properly spaced relation, thus preventing the segments moving together at certain points and consequent excessive widening of the slots along other lines of division between the segments, and prevent rotative movement thereof.

It will be seen that after the mandrel is divided into segments by the radial slits referred to, the edges of such segments can be moved into abutting relation, thereby contracting the mandrel. The segments are yieldably held in contracted relation by spring clips or collars 21 of wire-like form.

It will be seen that the mandrel can be placed in the block 6, with the pins 19 lying in the slots 18, and the sleeve 7 then screwed into place in the block.

The periphery of the mandrel 14 when in expanded position is circular at all points longitudinally thereof. In order that the inner surface of a ring which is expanded on the mandrel will be parallel to the axis of the ring and the mandrel, on lines extending longitudinally of the mandrel, the mandrel is stepped or offset as indicated 22, each offset portion being of course circular when the mandrel is expanded and each step corresponding to a certain ring size.

Assuming that the screw 8 has been turned back to withdraw the plunger 12 to permit contraction of the mandrel segments by the springs 21, and it is desired to enlarge a ring from size 4, for example to size 5, the ring is placed on the stepped portion *a* whereupon the screw 8 is turned to force the plunger 12 into the mandrel 14, thereby effecting expansion of the mandrel segments and stretching the ring. The tapering of the plunger 12 is such that if the screw 8 is turned to its innermost position, that is, with the enlargement at the outer end of the screw in abutting engagement with the end of the sleeve 7, or with the cap 11 engaging the base of the mandrel 14, the ring will be expanded a full size. Since the passageway or perforation through the mandrel is tapered to correspond to the taper of the plunger 12, all portions of the inner surfaces of the mandrel segments will be engaged by the plunger and expansive movement of the segments will occur on true radial lines. The swivel connection between the head 13 of the plunger and the screw prevents turning of the plunger and consequent tendency to twisting of the mandrel segments. Upon turning back of the screw 8, the mandrel sections will be permitted to move inwardly under the tension of the springs 21, thus releasing the ring.

A ring expanded at step *a* will when the mandrel is contracted, be of a size to fit upon the step *b*, which may be size 5, each succeeding step being a size larger than the preceding one. Of course, the difference in diameter between the adjacent steps need not necessarily be equal to a full ring size, but may be of any desired fraction of such size.

Assuming that the steps on the mandrel are graduated in full ring sizes, and it is desired to expand a ring for only one-fourth of a full size, the ring is placed upon the mandrel and the screw 8 advanced a distinct number of turns, depending upon the pitch of the screw threads to effect the desired expansion of the ring. For a half size increase, the screw would be advanced double the number of turns that it is advanced for a one-fourth size expansion, etc.

In Fig. 4, I have shown a mandrel 14*a* which is made in segments as is the mandrel 14 of Fig. 1, but whose periphery is straight on axial lines instead of being stepped. The operation of this mandrel is the same as in the case of Fig. 1, except that graduation marks may be provided thereon instead of the steps. The graduation marks may be omitted, since if it is desired to enlarge a ring to a predetermined diameter, it need simply be placed on the collapsed mandrel and the expanding screw given the required number of turns in order to effect the necessary expansion.

As heretofore stated, when the screw 8 is turned to its innermost position, the ring may be expanded a full size, thus automatically controlling the expansive movement of the mandrel. However, if it is desired to enlarge a ring only a fraction of a full ring size, the screw 8 will be turned back a predetermined number of turns from that position at which the mandrel is fully expanded, thus permitting contraction of the mandrel to a predetermined degree. The ring is then placed upon the thus partially-expanded mandrel, whereupon the screw 8 is screwed home, thereby automatically stretching the ring the desired fraction of a ring size.

If the mandrel is divided into a sufficient number of segments, the spaces between adjacent segments will be quite narrow, owing to the small expansive movement of the segments at each stretching operation. For instance, if six or more segments are employed, the spaces between the segments will be only about one-tenth millimeter in width when spread to expand a ring a one-fourth size. Ordinarily, this distance would be so small that there would be no noticeable protrusion of the metal from the ring into the spaces. However, in order to fully guard against protrusion of the metal into spaces between the mandrel, particularly where a small number of segments are used, I provide sleeves of celluloid or the like, as shown in Figs 5, 6 and 7. The sleeves of Figs. 5, 6 and 7 will be made of sizes to fit over the portions 22 of Fig. 1, and the sleeve of Fig. 7 will be made to conform to the mandrel of Fig 4. These sleeves are placed on the mandrel and the rings then placed over the sleeves Upon expansion of the mandrel, the sleeves will yield and will serve to bridge the space between segments and prevent extrusion of metal into such spaces, thus maintaining the ring truly circular. Even though the sleeve be made of thin yieldable material such a celluloid, they will effectively bridge the spaces between the mandrel sections because of the smallness of such spaces.

I claim as my invention:—

1. A ring expander comprising a base having a cylindrical chambered block portion a sleeve fitting within and having screw threaded engagement with said portion, a operating screw having its outer portion i screw-threaded engagement with the interic of said sleeve and protruding therefrom, th inner end portion of said screw being of re duced diameter and screw-threaded for th reception of a screw cap, a tapered plunge extending through the inner end of said ca and having a flanged head engaged by th cap to hold the plunger in assembled rel tion to the inner end of said screw, and segmental mandrel slidably supported by th said block in position to be expanded throug inward movement of the screw and plunge 2. A ring expander comprising a base ha ing a cylindrical chambered block portio a sleeve fitting within and having screw threaded engagement with said portion, a operating screw having its outer portion i screw-threaded engagement with the int rior of said sleeve and protruding ther from, the inner end portion of said screw b ng of reduced diameter and screw-threaded for the reception of a screw cap, a tapered plunger extending through the inner end of said cap and having a flanged head engaged by the cap to hold the plunger in assembled relation to the inner end of said screw, and a segmental mandrel slidably supported in position to be expanded through inward movement of the screw and plunger.

In testimony whereof I, the said JOSEPH MAZER, have hereunto set my hand.

JOSEPH MAZER.